US012157307B2

(12) United States Patent
Kato

(10) Patent No.: US 12,157,307 B2
(45) Date of Patent: Dec. 3, 2024

(54) LIQUID DISCHARGE APPARATUS, LIQUID DISCHARGE METHOD, FILM FORMING APPARATUS, AND ARTICLE MANUFACTURING METHOD

(71) Applicant: CANON KABUSHIKI KAISHA, Tokyo (JP)

(72) Inventor: Kentaro Kato, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 108 days.

(21) Appl. No.: 17/932,202

(22) Filed: Sep. 14, 2022

(65) Prior Publication Data

US 2023/0079890 A1 Mar. 16, 2023

(30) Foreign Application Priority Data

Sep. 16, 2021 (JP) ................................. 2021-151161

(51) Int. Cl.
*B41J 2/045* (2006.01)
*B41J 2/21* (2006.01)

(52) U.S. Cl.
CPC ....... *B41J 2/04535* (2013.01); *B41J 2/04581* (2013.01); *B41J 2/2135* (2013.01)

(58) Field of Classification Search
CPC ... B41J 2/04535; B41J 2/04581; B41J 2/2135
See application file for complete search history.

(56) References Cited

U.S. PATENT DOCUMENTS

2008/0259107 A1* 10/2008 Farr ....................... B41J 29/393 347/14
2010/0238210 A1* 9/2010 Oshima ................ B41J 2/04555 347/9

FOREIGN PATENT DOCUMENTS

JP 2011222705 A * 11/2011 ........... H01L 21/027
JP 2021-044407 A 3/2021

* cited by examiner

*Primary Examiner* — Yaovi M Ameh
(74) *Attorney, Agent, or Firm* — Canon U.S.A., Inc. IP Division

(57) ABSTRACT

A liquid discharge apparatus includes a substrate stage configured to be movable while holding a substrate, a discharge unit having nozzles for discharging droplets, a control unit configured to perform control to supply driving signals for discharging droplets from the nozzles to the discharge unit while moving the substrate stage, and an acquisition unit configured to acquire sizes of the droplets discharged onto the substrate, wherein the control unit performs control to discharge a plurality of droplets from the nozzles onto the substrate by supplying a plurality of driving signals for discharging droplets of different volumes to the discharge unit, and wherein the control unit identifies the driving signals corresponding to the droplets on the substrate based on the sizes of the droplets on the substrate acquired by the acquisition unit.

12 Claims, 13 Drawing Sheets

LIQUID DISCHARGE APPARATUS, LIQUID DISCHARGE METHOD, FILM FORMING APPARATUS, AND ARTICLE MANUFACTURING METHOD

BACKGROUND

Field

The present disclosure relates to a liquid discharge apparatus, a liquid discharge method, a film forming apparatus, and an article manufacturing method.

Description of the Related Art

With the increase in the demand for the miniaturization of semiconductor devices and Micro Electro Mechanical Systems (MEMS), the imprint technique for forming a minute pattern (structure) in order of several nanometers on a substrate is attracting attention as well as the conventional photo-lithography technique. The imprint technique refers to a microfabrication technique for forming, on a substrate, an imprint material pattern corresponding to a minute relief pattern formed on a mold. In the imprint technique, an uncured imprint material is supplied (applied) to the substrate, and the imprint material and the mold are brought into contact with each other.

In the process of supplying such an imprint material onto a substrate, a discharge apparatus that supplies droplets of the imprint material from nozzles (discharge ports) by using an inkjet method can be used. More specifically, this process is performed while a substrate stage is driven to perform scanning in a reciprocating manner so that a shot region on the substrate faces the discharge port surface of a dispenser. In this state, the imprint material (liquid) is discharged from the discharge ports to dispose droplets on the substrate.

To form an exact relief pattern on the substrate, it is necessary to place droplets of the imprint material at desired positions. More specifically, it is necessary to restrain the impact error of each droplet to be placed in the shot region within several micrometers (μm). If the imprint processing is performed in a state where droplets are placed with an impact error of the imprint material exceeding a permissible value, the imprint material protrudes out of the mold region in the mold pressing step. Accordingly, there arises a concern that the protruding imprint material may cause trouble as a foreign object. In other case, the imprint material may not be supplied to the entire imprint region in the mold pressing step, and an unfilled defect may occur.

Japanese Patent Laid-Open No. 2011-222705 discloses a technique for improving the accuracy of impact positions. According to Japanese Patent Laid-Open No. 2011-222705, impact positions are detected by capturing an image of droplets of an imprint material discharged in a predetermined region on a substrate, and the drive of a substrate stage for holding the substrate is controlled based on the deviation amount between impact and target positions.

Japanese Patent Laid-Open No. 2021-44407 discloses a technique for improving the placement accuracy by correcting the discharge timing of a defective nozzle (having a discharge angle and a discharge rate deviated from those of other nozzles) by differentiating the discharge timing of the defective nozzle from the discharge timing of normal nozzles.

With the techniques for improving the placement accuracy by correcting the substrate stage drive and the discharge timing according the deviation amount between impact and target positions disclosed in Japanese Patent Laid-Open No. 2011-222705 and Japanese Patent Laid-Open No. 2021-44407, it is prerequisite that impact positions of droplets are correctly associated with target positions of the droplets. As a method for implementing such association, there is provided a method for recognizing a droplet of the imprint material placed at the closest position to a target position as the droplet that needs to be placed at the target position.

However, there is a concern that, if the impact position is largely deviated due to a foreign object adhering to the vicinity of the nozzle or if the imprint material cannot be discharged from the nozzle, the above-described method cannot implement the correct association, making it impossible to correct the discharge timing to improve the placement accuracy.

SUMMARY

The present disclosure is directed to providing a configuration that enables identifying droplets that need to be placed at predetermined target positions and is advantageous in improving the accuracy of impact positions of droplets.

According to an aspect of the present disclosure, a liquid discharge apparatus includes a substrate stage configured to be movable while holding a substrate, a discharge unit having nozzles for discharging droplets, a control unit configured to perform control to supply driving signals for discharging droplets from the nozzles to the discharge unit while moving the substrate stage, and an acquisition unit configured to acquire sizes of the droplets discharged onto the substrate, wherein the control unit performs control to discharge a plurality of droplets from the nozzles onto the substrate by supplying a plurality of driving signals for discharging droplets of different volumes to the discharge unit, and wherein the control unit identifies the driving signals corresponding to the droplets on the substrate based on the sizes of the droplets on the substrate acquired by the acquisition unit.

Further features of the present disclosure will become apparent from the following description of exemplary embodiments with reference to the attached drawings.

DESCRIPTION OF THE EMBODIMENTS

Figure 1:
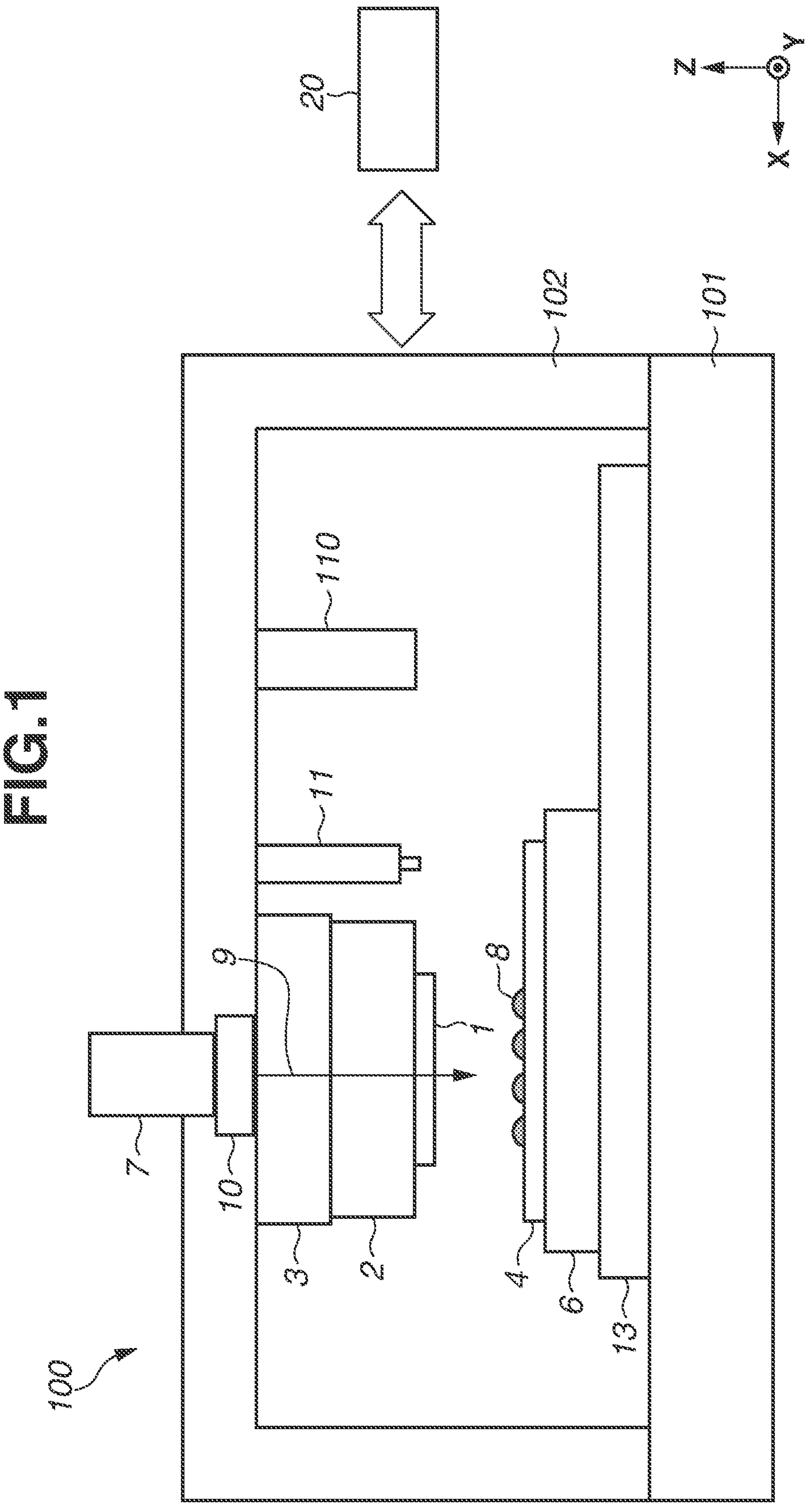
FIG. 1 is a schematic view illustrating a configuration of an imprint apparatus according to an exemplary embodiment of the present disclosure.

Exemplary embodiments of the present disclosure will be described below with reference to the accompanying drawings. In each drawing, identical members are assigned the same reference numerals, and duplicated descriptions thereof will be omitted.

A first exemplary embodiment will be described below centering on an imprint apparatus as an example of a molding apparatus (a film forming apparatus). The imprint apparatus according to the present exemplary embodiment is a lithography apparatus that discharges (supplies) an uncured liquid imprint material or ink onto a substrate to form (transfer) a pattern on the substrate. A molding apparatus, to which the liquid discharge apparatus of the present disclosure is applicable, is not limited to an imprint apparatus. The liquid discharge apparatus of the present disclosure is also applicable to a flattening apparatus that flattens a relief on a semiconductor substrate. Further, the liquid discharge apparatus of the present disclosure is widely applicable to industrial apparatuses including manufacturing apparatuses for semiconductor devices and liquid crystal display devices, and apparatuses having a mechanism for discharging droplets, including printers and other consumer products.

FIG. 1 is a schematic view illustrating a configuration of an imprint apparatus 100 including the liquid discharge apparatus according to the present exemplary embodiment. The imprint apparatus 100 includes a base 101, a frame 102, a substrate stage drive unit 13, a substrate stage 6, a mold chuck 2, a mold drive unit 3, a dispenser 11, an alignment scope 110, and a control unit 20. The base 101 supports the substrate stage drive unit 13 and the frame 102. The frame 102 supports the mold drive unit 3, the dispenser 11, and the alignment scope 110.

The imprint apparatus 100 is used to manufacture a semiconductor device as an article. Droplets 8 of an uncured curable composition, i.e., an imprint material applied to a substrate 4 are brought into contact with a mold 1 to form a pattern of the droplets 8 on the substrate 4. For example, the imprint apparatus 100 employs a photo-curing method for curing an imprint material by irradiating the imprint material with ultraviolet light. The present disclosure is also applicable to an imprint apparatus that cures an imprint material by using other energy (for example, heat). In the following drawings, the Z axis is taken along the vertical direction, and the X and Y axes perpendicularly intersecting with each other are taken in the plane perpendicular to the Z axis.

The substrate stage drive unit 13 includes an actuator such as a linear motor. The substrate stage drive unit 13 drives the substrate stage 6 supporting the substrate 4, in a plane parallel to the top surface of the base 101, i.e., in the X and Y directions. More specifically, the substrate stage 6 and the substrate stage drive unit 13 function as a substrate holding mechanism (substrate holding unit) that is movable while holding the substrate 4. When the mold 1 comes into contact with the imprint material on the substrate 4, the substrate stage drive unit 13 performs positioning between the mold 1 and the substrate 4. Further, when the imprint material is applied onto the substrate 4, the substrate stage drive unit 13 performs stage drive control so that the substrate 4 is positioned at a predetermined target position at a predetermined timing. More specifically, by moving the relative position between the substrate 4 and the dispenser 11, the substrate stage drive unit 13 can perform stage drive control so that the imprint material is placed at an arbitrary position on the substrate 4.

The mold chuck 2 attracts the outer periphery area of the irradiation surface of an ultraviolet light 9 on the mold 1 with a vacuum suction force and an electrostatic force to hold the mold 1 having a relief pattern formed on a surface thereof. The mold drive unit 3 includes an actuator such as a linear motor and an air cylinder. The mold drive unit 3 drives the mold chuck 2 in the direction perpendicular to the substrate 4, i.e., in the Z direction, to press the mold 1 onto the substrate 4 and release the mold 1 from the substrate 4.

More specifically, the mold chuck 2 and the mold drive unit 3 function as a mold holding mechanism (mold holding unit). The contact and release operations in the imprint processing may be implemented by driving the substrate stage 6 to move the substrate 4 in the Z-axis direction or by relatively moving both the mold 1 and the substrate 4.

The light irradiation unit 7 is a curing unit that adjusts the ultraviolet light emitted from a light source (not illustrated) into light (ultraviolet light 9) suitable for curing the imprint material, and allows passage of the light through the mold 1 to irradiate the imprint material with the light. In this case, the light source may be, for example, a mercury lamp that generates the i and g rays. However, the light source is not limited to ultraviolet light but needs to generate light having a wavelength that passes through the mold 1 and cures the imprint material. When the thermosetting method is employed, it is necessary to dispose, as a curing unit, a heating unit for curing a curable composition in the vicinity of the substrate stage 6 instead of the light irradiation unit 7.

The mold 1 is square-shaped and has a minute relief pattern three-dimensionally formed at the center of the surface facing the substrate 4. The material of the mold 1 is, for example, a quartz that allows passage of ultraviolet light.

The substrate 4 is, for example, a substrate (object) to be processed made of single crystal silicon. To manufacture an article other than semiconductor devices, examples of materials applicable to the substrate 4 include optical elements such as a quartz and other optical glasses, and light emitting elements such as GaN and SiC. As required, a member made of a different material from the substrate 4 may be formed on the surface of the substrate 4.

A camera 10 (spread camera) is configured (disposed) to include the pattern region of the mold 1 held by the mold chuck 2 in the visual field, and acquires an image by capturing at least either one the mold 1 and substrate 4. In the imprint processing, the camera 10 can be used as an imaging unit that observes the contact states between the mold 1 and the imprint material on the substrate 4. The camera 10 acquires, as image information, droplets formed by the imprint material discharged onto the substrate 4 and subjects the acquired image to image processing to acquire impact positions and sizes of droplets on the substrate 4.

The dispenser 11 (discharge unit) applies an uncured imprint material (discharges droplets of the imprint material) with a desired application pattern onto a shot region (pattern forming region) preset on the substrate 4. More specifically, the dispenser 11 is provided with a plurality of the nozzles 31 that discharges droplets of an uncured imprint material onto the substrate 4. Each nozzle 31 is provided with a portion for forming a region where ink exists and a discharge energy generation element that generates a discharge energy for discharging the ink in the region from an opening (discharge port).

When each discharge energy generation element is driven and controlled, droplets are discharged from each nozzle 31. The nozzles 31 are arranged in a row in the Y direction. A plurality of rows of nozzles arranged in the Y direction may be arranged in the X direction. The present embodiment will be described below centering on an example where a piezoelectric element is used as the discharge energy generation element of each nozzle. The piezoelectric element can discharge the imprint material by using the piezoelectric effect. The discharge amount of the imprint material to be discharged can be changed by changing the voltage waveform applied to the piezoelectric element. More specifically, the discharge timing and the discharge amount can be independently controlled for each nozzle by suitably controlling the driving signals that determine the voltage waveform applied to the piezoelectric elements.

It is demanded that the imprint material has flowability when being supplied between the mold 1 and the substrate 4, and is solid to maintain its shape after the mold formation. According to the present exemplary embodiment, in particular, the imprint material is an ultraviolet curable resin (photocurable resin) having a characteristic to cure when being irradiated with the ultraviolet light 9. Depending on various conditions of the article manufacturing process, a thermosetting resin or thermoplastic resin may be used instead of a photocurable resin. An ultraviolet curable resin contains at least a polymeric compound and a photopolymerization initiator, and may further contain a non-polymeric compound or a solvent as required. A non-polymeric compound is at least a type selected from groups of sensitizers, hydrogen donators, internal mold release agents, surfactants, antioxidants, and polymer components.

The alignment scope 110 detects alignment marks provided on the substrate 4. The alignment scope 110 also functions as an imaging unit to acquire droplets formed by the imprint material discharged onto the substrate 4, as image information. When the acquired image is subjected to image processing, impact positions and sizes of droplets on the substrate 4 can be acquired.

The control unit (control means) 20 can control operations and correction for each component of the imprint apparatus 100. The control unit 20 includes, for example, a computer including a central processing unit (CPU), a read only memory (ROM), and a random access memory (RAM). Various types of calculation processing are performed by the CPU. The control unit 20 is connected to each component of the imprint apparatus 100 via a circuit, and controls each component according to a program stored in the ROM.

The control unit 20 may be integrally configured with other portions of the imprint apparatus 100 or may be separately configured from other portions of the imprint apparatus 100. The control unit 20 may be configured to include a plurality of computers instead of a single computer, and an Application Specific Integrated Circuit (ASIC).

Figure 2:
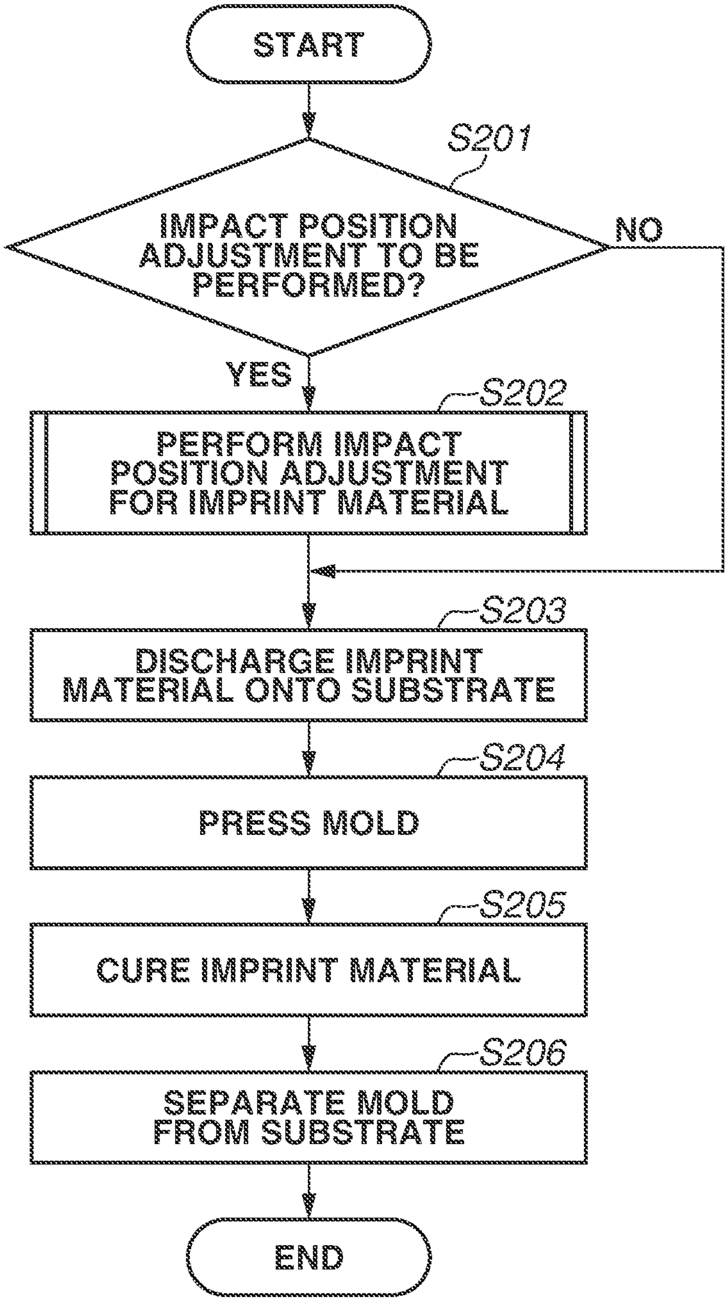
FIG. 2 is a flowchart illustrating imprint processing.
Figure 3:
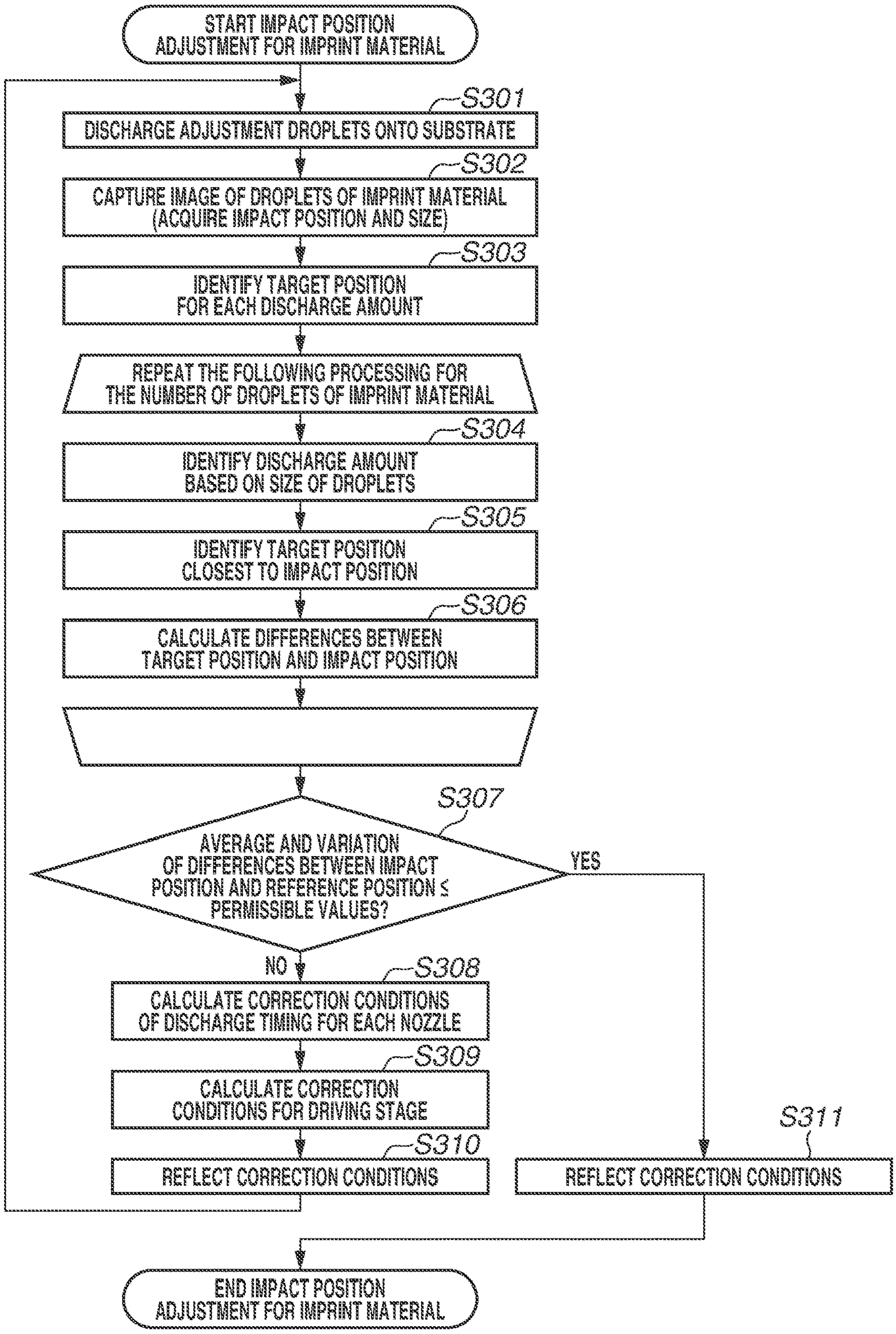
FIG. 3 is a flowchart illustrating processing for adjusting an impact position of a droplet.

The imprint processing and processing for adjusting the impact positions of droplets of the imprint material according to the present exemplary embodiment will be described below with reference to FIGS. 2 and 3. FIG. 2 is a flowchart illustrating the imprint processing. FIG. 3 is a flowchart illustrating impact position adjustment processing for droplets. This processing in the flowcharts illustrated in FIGS. 2 and 3 is implemented when the CPU201 reads a control program stored in a memory such as a storage medium and executes the program.

Referring to FIG. 2, in step S201, the control unit 20 determines whether the impact position adjustment processing for the imprint material is required. For example, this processing is determined to be required in the first imprint processing after the installation of the imprint apparatus 100, the first imprint processing after the replacement of the substrate stage 6, the first imprint processing after the replacement of the dispenser 11, and when aging of the imprint apparatus 100 is anticipated. In a case where the control unit 20 determines that the processing is required (YES in step S201), the processing proceeds to step S202. In step S202, the control unit 20 performs the impact position adjustment processing (described below). The impact position adjustment processing in step S202 can be performed not only when the processing is determined to be required in step S201 but also at a necessary timing.

Figure 4:
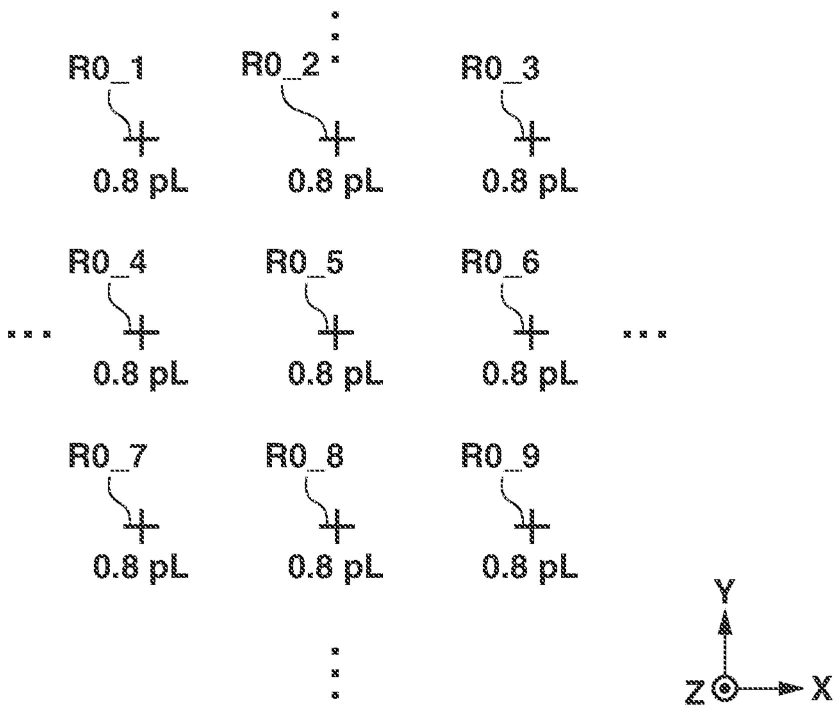
FIG. 4 illustrates examples of target positions of a droplet pattern discharged under predetermined discharge conditions (recipe).

In step S203, the control unit 20 controls the dispenser 11 to discharge the imprint material from the dispenser 11 at a predetermined timing while driving the substrate stage 6 at a predetermined speed (an approximately fixed speed) to form a droplet pattern of the imprint material on the substrate 4. The droplet pattern is formed when the control unit 20 reads discharge conditions called a recipe stored in a memory such as a storage medium. FIG. 4 illustrates examples of target positions of a droplet pattern discharged under predetermined discharge conditions (recipe). FIG. 4 illustrates target positions (reference positions) R0_1 to R0_9 of droplets. The recipe includes information about the target position and discharge amount of each droplet, i.e., drive conditions (driving signals) for driving the piezoelectric elements to discharge the droplet pattern at predetermined target positions with predetermined discharge amounts, and drive conditions of the substrate stage 6.

The size of a droplet placed on the substrate 4 increases with increasing discharge amount. FIG. 4 illustrates an example of a droplet pattern in which 0.8-pL droplets are arranged in a lattice form. Droplets having the same Y coordinates of the target positions are discharged from the same nozzle. Referring to the example of the recipe in FIG. 4, droplets for the target positions R0_1, R0_2, and R0_3 are discharged from the same nozzle, droplets for the target positions R0_4, R0_5, and R0_6 are discharged from the same nozzle, and droplets for the target positions R0_7, R0_8, and R0_9 are discharged from the same nozzle. When nozzles of the dispenser 11 arranged in a row in the Y direction discharge droplets onto the substrate 4 driven in the X direction at a suitable timing, a lattice form droplet pattern such as the recipe in FIG. 4 is formed.

In step S204, the control unit 20 drives and controls the mold drive unit 3 to press the mold 1 onto the droplets 8 of the imprint material on the substrate 4. In this processing, the relief pattern on the mold 1 is filled with the imprint material.

In step S205, while pressing the mold 1 onto the substrate 4, the control unit 20 instructs the light irradiation unit 7 to irradiate the imprint material with light to cure the imprint material. Then, in step S206, the control unit 20 drives the mold drive unit 3 to release the mold 1 from the cured imprint material on the substrate 4, thus completing the imprint processing.

The impact position adjustment processing in step S202 will be described below with reference to FIG. 3. In step S301, the control unit 20 forms a droplet pattern of the imprint material for adjustment on the substrate 4 by using an adjustment recipe. More specifically, the control unit 20 discharges the imprint material from the dispenser 11 at a predetermined timing while driving the substrate stage 6 at a predetermined speed. It is desirable that the position where the imprint material for adjustment is placed in step S301 is a position different from the position to be applied with the imprint material in step S203. More desirably, the placement position is on a substrate for adjustment. The adjustment recipe used for the impact position adjustment processing includes information about the target position and discharge amount of each droplet, i.e., drive conditions (driving signals) for driving the piezoelectric elements so that the predetermined discharge amount of the imprint material is discharged at predetermined target positions, and drive conditions for the substrate stage 6.

The adjustment recipe is set to differentiate the discharge amount between droplets discharged from at least the same nozzle corresponding to target positions adjacent in the X-axis direction. Differentiating the discharge amount between adjacent droplets in this way causes a difference in size between droplets on the substrate 4. Therefore, even if the impact position is largely deviated due to a foreign object adhering to the vicinity of the nozzle, the corresponding droplet can be easily identified. When the discharge amount of the imprint material is changed, the discharge rate of the imprint material also changes resulting in a deviated application position of the imprint material. Therefore, it is desirable that the adjustment recipe takes the discharge amount into account in determining the discharge timing so that the impact position is not affected by the difference in the discharge amount.

Also, the adjustment recipe may be set to differentiate the discharge amount not only between droplets discharged from the same nozzle but also between droplets discharged from adjacent nozzles corresponding to target positions adjacent in the Y-axis direction. Thus, corresponding droplets can be easily identified even if the impact position deviates in the Y-axis direction.

In step S301, the control unit 20 forms a droplet pattern for adjustment on the substrate 4 by using the adjustment recipe. More specifically, the control unit 20 sequentially outputs a plurality of driving signals to discharge droplets of different volumes from the nozzles while driving the substrate stage 6 at a constant speed.

In step S302, the control unit 20 drives the substrate stage 6 to enable the imaging unit to capture regions on the substrate 4 where droplets discharged based on the adjustment recipe were placed in step S203, and the imaging unit captures an image of the droplets. As described above, the alignment scope 110 and the spread camera 10 can be used as the imaging unit. Further, the control unit 20 calculates and acquires the impact position and size of each droplet based on an image captured by the imaging unit. More specifically, the control unit 20 functions as an acquisition unit for acquiring the impact positions and sizes of droplets discharged onto the substrate 4.

In step S303, the control unit 20 divides the adjustment recipe used in discharging droplets in step S301 for each discharge amount, generates a plurality of pieces of data for adjustment for identifying target positions of droplets, i.e., identifying which driving signals were used in discharging droplets, and stores the data in a memory. More specifically, the control unit 20 identifies the target positions of droplets for each discharge amount in the adjustment recipe and the corresponding driving signals. For example, in a case where the adjustment recipe used in step S301 includes two different droplets with 0.7- and 0.9-pL discharge amounts, adjustment data as a result of extracting target positions of droplets with a 0.7-pL discharge amount and adjustment data as a result of extracting target positions of droplets with a 0.9-pL discharge amount are generated. Since step S303 is not indispensable, driving signals may be directly identified from the adjustment recipe when identifying target positions in step S305.

The control unit 20 repeats the processing in steps S304 to S305 the number of times equal to the number of droplets having been placed on the substrate 4 in the adjustment recipe. The repetitive processing in steps S304 to S305 does not need to be performed for all droplets on the substrate 4 but may be suitably adjusted according to the processing time.

In step S304, based on the size of a target droplet acquired in step S302, the control unit 20 identifies the discharge amount of the droplet. The relation between the discharge amount and the size of a droplet depends on the distance between the dispenser 11 and the substrate 4, the time interval since the imprint material is applied in step S301 till image capturing is performed in step S302, and the surface condition of the substrate 4. Therefore, it is desirable, as advance preparation, to measure the sizes of droplets when droplets with each discharge amount used in the adjustment recipe are captured and prestore the relation between the discharge amount and the size of droplets in a memory. Then, the discharge amount can be identified by using this relation in step S304. Under a certain condition of the imprint apparatus according to the present exemplary embodiment, in a case where the size of droplets with a 0.7-pL discharge amount is around 4,300 μm2, the size of droplets with a 0.9-pL discharge amount is around 4,800 μm2.

In step S305, the control unit 20 selects the adjustment data corresponding to the discharge amount identified in step S304 from a plurality of pieces of the adjustment data generated in step S303, and identifies the droplet at the target position closest to a droplet impact position from the selected piece of the adjustment data, as the target droplet corresponding to the placed droplet. This process also enables identifying the driving signal used in discharging the droplet. More specifically, the control unit 20 identifies the droplet of the imprint material placed at a position closest to a target position as the droplet that needs to be placed at the target position.

In step S306, the control unit 20 calculates the difference between the impact position of the droplet acquired in step S302 and the target position identified in step S305. In this case, it is desirable to calculate the differences in the X and Y directions between the two positions.

In step S307, the control unit 20 calculates the differences in the X and Y directions between the target and the impact positions of a plurality of droplets acquired in steps S304 to S305, calculates the average and variation of the differences, and determines whether the average and variation are within respective permissible values. More specifically, the control unit 20 determines whether the average of the differences in the X and Y directions between the target and the impact positions is within around 3 μm, and the variation 3σ of the differences is within around 10 μm. This is because a failure hardly occurs during the mold pressing step when the average and variation are within these ranges. In a case where the control unit 20 determines that both the average and variation are within the respective permissible values (YES in step S307), the processing proceeds to step S311. On the other hand, in a case where the control unit 20 determines that either one of the average and variation is not within the permissible value (NO in step S307), the processing proceeds to step S308.

In step S308, the control unit 20 calculates the average of the differences in the X direction between the impact and the target positions of droplets discharged from the same nozzle, and obtains correction conditions (drive conditions) for correcting the droplet discharge timing of the nozzle corresponding to the Y coordinates based on the average. Assume an example case where the average of the differences in the X direction between the impact and the target positions of droplets discharged from a certain nozzle is +10 μm. In this case, the moving speed of the substrate stage 6 during droplet discharge is 1 mm/s in the positive X direction. In this case, advancing the timing of droplet discharge from the nozzle by 10 ms enables bringing the impact position of the imprint material close to the target position, thus improving the placement accuracy.

In step S309, the control unit 20 calculates the average of the differences in the Y direction between the impact and the target positions of a plurality of droplets acquired in steps S304 to S305. The calculated average can also be used as a correction value for the driving position of the substrate stage 6. Assume an example case where the difference in the Y direction between the impact and the target positions of droplets is +5 μm. In this case, correcting the drive target coordinates of the substrate stage 6 at a predetermined timing by +5 μm in the Y direction enables improving the placement accuracy of droplets. Since the deviation in the X direction can be corrected by controlling the stage driving position, the impact position in the X direction can also be corrected with a combination of the correction of the discharge timing in step S308 and the correction by the stage control.

In step S310, the control unit 20 reflects the correction conditions acquired in steps S308 and S309 to the adjustment recipe. Then, the processing returns to step S301. The control unit 20 performs the impact position adjustment processing again in a state where the correction conditions are applied. More specifically, the control unit 20 corrects the driving signals for driving the piezoelectric elements in the adjustment recipe used in step S301 to provide the discharge timing acquired in step S308 so that the drive target coordinates of the substrate stage 6 indicate the position acquired in step S309.

Subsequently, the processing returns to step S301. Then, the control unit 20 repeats the impact position adjustment processing until the average and variation of the differences between the impact and the target positions fall within the respective permissible values in step S307.

In step S311, the control unit 20 reflects the conditions of the adjustment recipe where the average and variation of the differences between the impact and the target positions are within the respective permissible values to the recipe used in step S203. Then, the processing exits the flowchart.

More specifically, the control unit 20 sets the driving signals for driving the piezoelectric elements, the drive target coordinates of the substrate stage 6, and other discharge conditions so that the impact positions of droplets during the imprint processing become close to the target positions.

This enables performing the imprint processing under the discharge conditions with the improved impact position accuracy, making it possible to prevent the protrusion of the imprint material and the occurrence of an unfilled defect in the mold pressing step.

Specific examples of the above-described impact position adjustment processing using various adjustment recipes will be described below with reference to the accompanying drawings.

Comparative Example

Figure 5A:
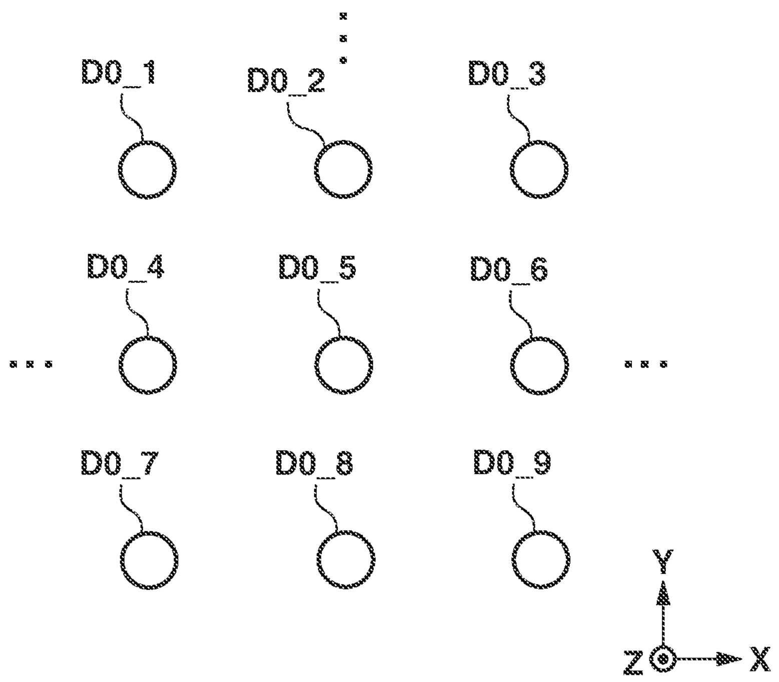
FIGS. 5A and 5B illustrate impact positions of droplets, discharged under discharge conditions illustrated in FIG. 4, on a substrate.
Figure 5B:
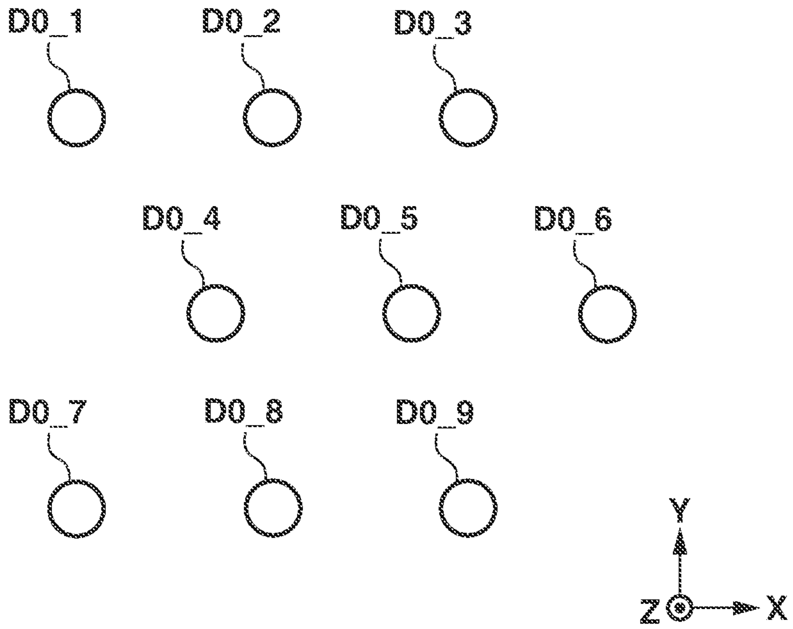

A comparative example where the discharge amount is equalized for all droplets in the adjustment recipe will be described below with reference to FIGS. 4 to 6. When droplet discharge (S301) in the impact position adjustment processing is performed under a discharge condition of the same discharge amount for all droplets, as illustrated in FIG. 4, based on the recipe used for the imprint processing, droplet patterns as illustrated in FIGS. 5A and 5B are formed on the substrate 4. D0_1 to D0_9 denote droplets placed on the substrate 4. FIG. 5A illustrates an ideal droplet pattern where there are no differences between the impact and the target positions of droplets of the imprint material. FIG. 5B illustrates a droplet pattern where droplets are placed at positions deviated from the target positions, which occurs when there exists a nozzle with a deviated discharge angle. When the droplet pattern in FIG. 5A is formed, it is not necessary to adjust the impact positions of the imprint material. On the other hand, the droplet pattern in FIG. 5B indicates that the nozzles that discharged the droplets D0_4, D0_5, and D0_6 have a deviated discharge angle. In this case, since the impact positions are deviated in the positive X direction, the discharge timing for droplets of the imprint material needs to be corrected.

Figure 6:
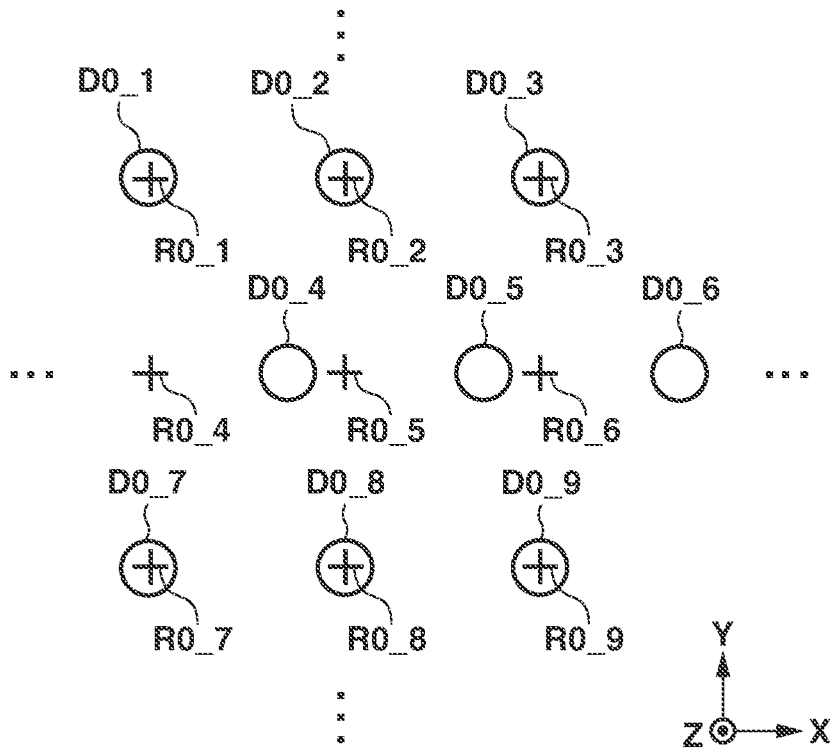
FIG. 6 illustrates a result of overlapping the target positions illustrated in FIG. 4 and the impact positions illustrated in FIGS. 5A and 5B.

FIG. 6 illustrates a result of overlapping the impact positions of the droplet pattern in FIG. 5B and the target positions in FIG. 4. All droplets are assigned the same discharge amount in the comparative example in FIGS. 4 to 6. Therefore, if the target position closest to the impact position is associated as the corresponding position for each droplet, R0_5 is selected as the reference position of the droplet D0_4, and R0_6 is selected as the reference position of the droplet D0_5. However, the original reference position of the droplet D0_4 is R0_4, and the original reference position of the droplet D0_5 is R0_5. This means that the association between the impact and the target positions is wrong. In this case, even if correction conditions are calculated in step S308, it is not possible to calculate correct correction conditions, making it impossible to suitably correct the discharge timing of the nozzle with a deviated discharge angle. If a plurality of nozzles with a deviated discharge angle exists, and wrong target positions are similarly selected for droplets discharged from these nozzles, the correction of the stage drive in step S309 is also affected. Therefore, when the deviation of the impact position of a droplet is larger than the distance between the reference positions in the recipe, the impact and the target positions of the droplet may not be correctly associated with each other in the adjustment recipe with the same droplet volume.

Figure 7:
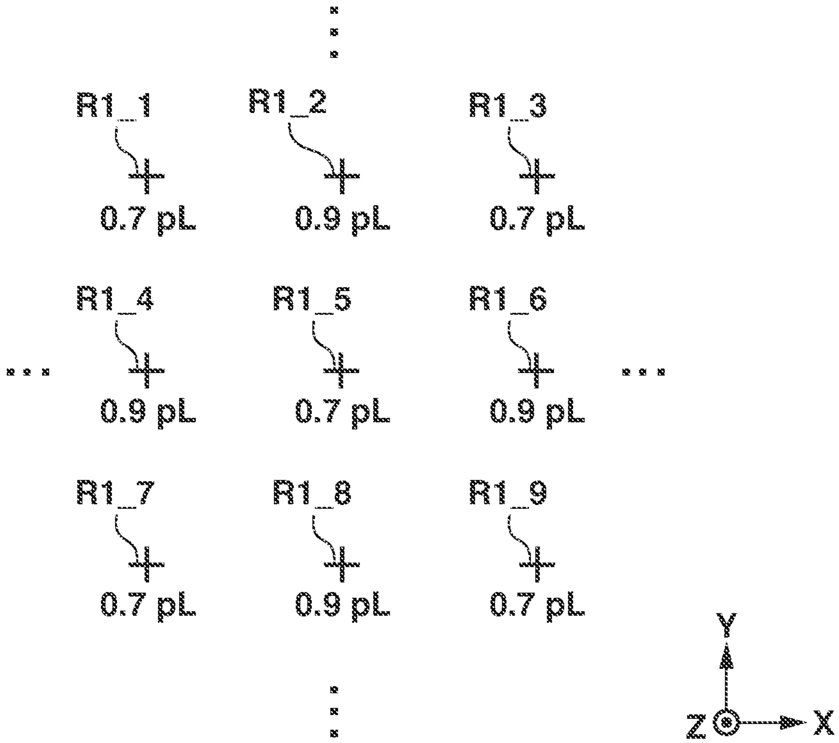
FIG. 7 illustrates target positions of a droplet pattern discharged based on an adjustment recipe according to a first exemplary embodiment.

The first exemplary embodiment will be described below with reference to FIGS. 7 to 10 centering on a case where the adjustment recipe includes two different droplets with 0.7-pL and 0.9-pL discharge amounts. FIG. 7 illustrates examples of target positions for a droplet pattern to be discharged in the adjustment recipe.

FIG. 7 illustrates target positions R1_1, R1_3, R1_5, R1_7, and R1_9 of droplets with a 0.7-pL discharge amount, and target positions R1_2, R1_4, R1_6, and R1_8 of droplets with a 0.9-pL discharge amount. In the adjustment recipe as illustrated in FIG. 7, droplets corresponding to adjacent target positions are differentiated in the discharge amount.

Figure 8A:
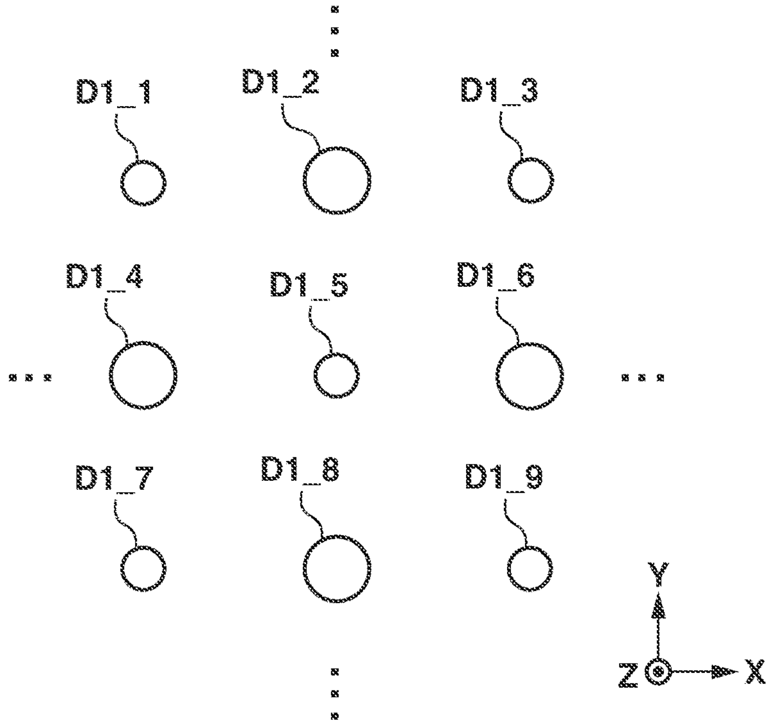
FIGS. 8A and 8B illustrate impact positions of droplets, discharged under discharge conditions illustrated in FIG. 7, on the substrate.
Figure 8B:
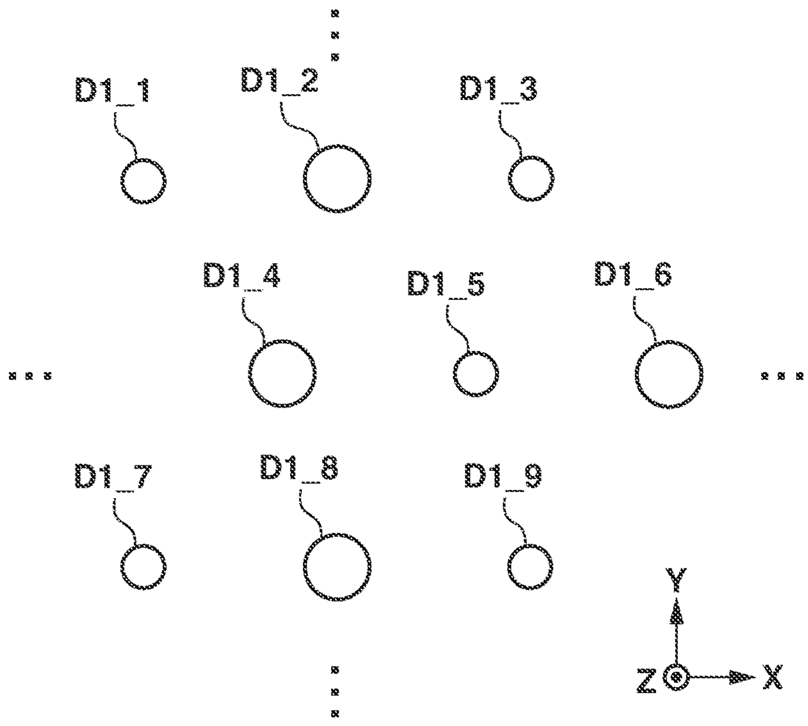

When the control unit 20 performs droplet discharge (S301) in the impact position adjustment processing by using this adjustment recipe, a droplet pattern as illustrated in FIG. 8A is formed. Droplets discharged with a 0.7-pL discharge amount are comparatively smaller in size than droplets discharged with a 0.9-pL discharge amount. However, FIGS. 8A and 8B illustrate the difference in droplet size due to the difference in the discharge amount in an emphasized way to make it easier to recognize the difference in droplet size. FIG. 8A illustrates an ideal droplet pattern where there are no differences between the impact and the target positions of droplets of the imprint material. FIG. 8B illustrates a droplet pattern where droplets are placed at positions deviated from the target positions, which occurs when there exists a nozzle with a deviated discharge angle. When the droplet pattern in FIG. 8A is formed, it is not necessary to adjust the impact positions of the imprint material. On the other hand, the droplet pattern in FIG. 8B indicates that the nozzles that discharged the droplets D1_4, D1_5, and D1_6 have a deviated discharge angle. In this case, since the impact positions are deviated in the positive X direction, the discharge timing for droplets of the imprint material needs to be corrected.

Figure 9A:
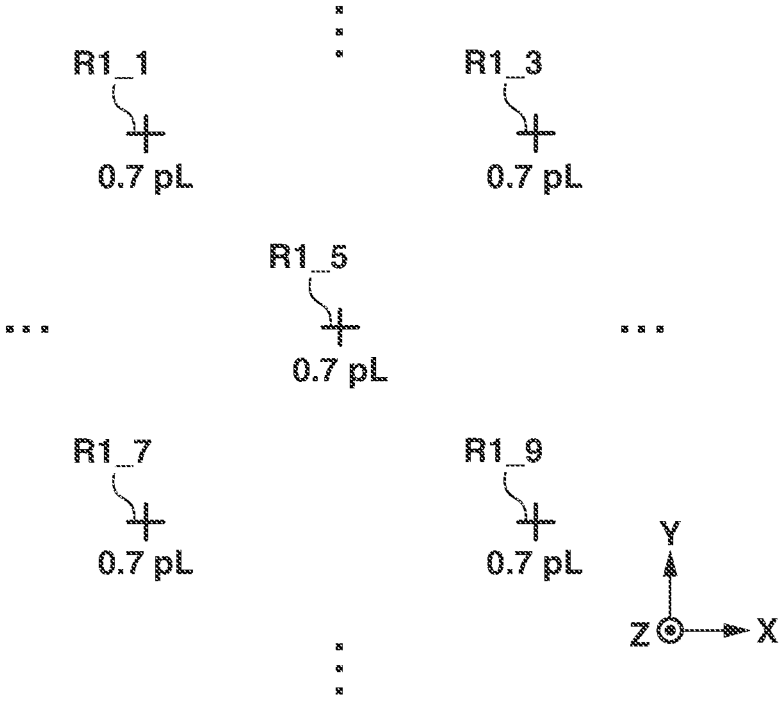
FIGS. 9A and 9B illustrate target positions of droplets for each discharge amount in the adjustment recipe illustrated in FIG. 7.
Figure 9B:
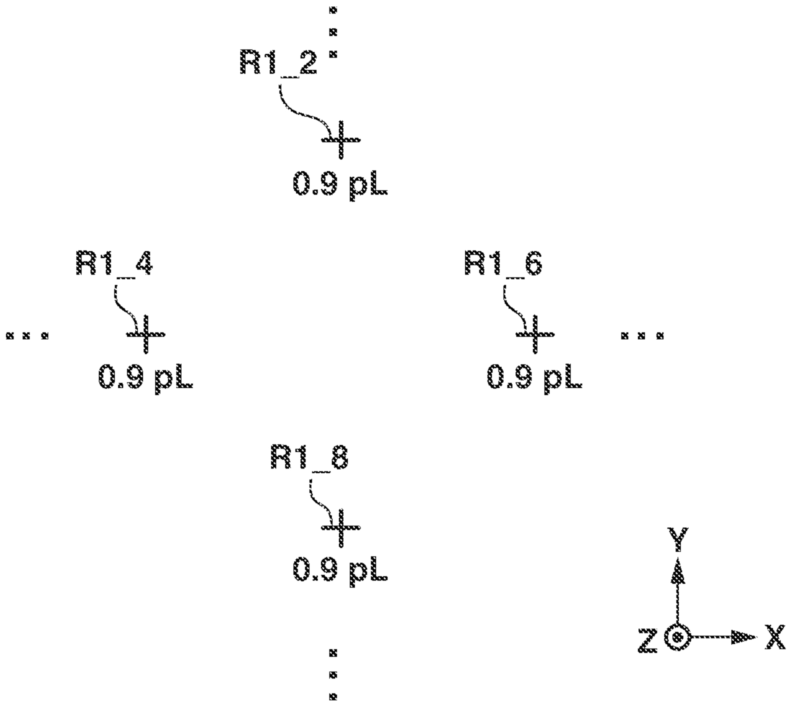

FIGS. 9A and 9B illustrate target positions of droplets for each discharge amount in the adjustment recipe in FIG. 7.

FIG. 9A illustrates target positions of droplets with a 0.7-pL discharge amount in the adjustment data generated from the adjustment recipe in step S303. FIG. 9B illustrates target positions of droplets with a 0.9-pL discharge amount in the adjustment data. In a case where droplets illustrated in FIGS. 8A and 8B are captured in step S302, the discharge amounts of the droplets D1_1, D1_3, D1_5, D1_7, and D1_9 are identified as 0.7 pL (S304), and target positions are identified based on the adjustment data in FIG. 9A (S305). Likewise, the discharge amounts of the droplets D1_2, D1_4, D1_6, and D1_8 are identified as 0.9 pL (S304), and target positions are identified based on the adjustment data in FIG. 9A (S305).

Figure 10A:
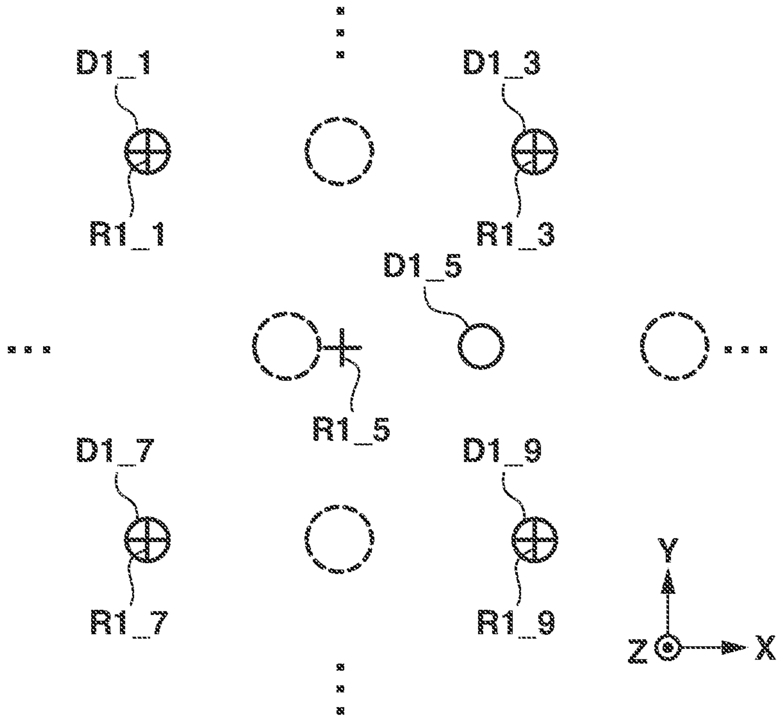
FIGS. 10A and 10B illustrate results of overlapping the target positions for each discharge amount illustrated in FIGS. 9A and 9B, respectively, and the impact positions illustrated in FIG. 8B.

FIG. 10A illustrates a result of overlapping the adjustment data (target positions with a 0.7-pL discharge amount) in FIG. 9A and the impact positions illustrated in FIG. 8B. Referring to FIG. 10A, droplets identified as a droplet with a 0.7-pL discharge amount in step S304 are drawn with solid lines, and other droplets are drawn with dotted lines.

In step S305, the control unit 20 identifies the droplet at the target position closest to the impact position from the selected piece of the adjustment data, as the target droplet corresponding to the placed droplet. More specifically, R1_1, R1_3, R1_5, R1_7, and R1_9 are identified as the target positions for the droplets D1_1, D1_3, D1_5, D1_7, and D1_9, respectively.

Figure 10B:
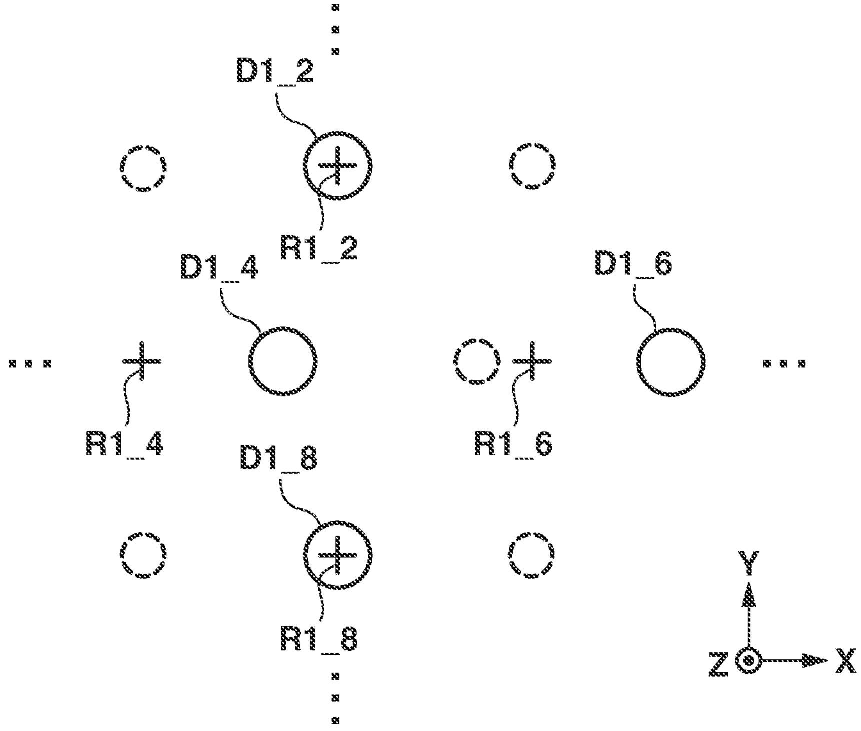

FIG. 10B illustrates a result of overlapping the adjustment data (target positions with a 0.9-pL discharge amount) in FIG. 9B and the impact positions illustrated in FIG. 8B. Referring to FIG. 10B, droplets identified as a droplet with a 0.9-pL discharge amount in step S304 are drawn with solid lines, and other droplets are drawn with dotted lines.

More specifically, in step S305, R1_2, R1_4, R1_6, and R1_8 are identified as the target positions for the droplets D1_2, D1_4, D1_6, and D1_8, respectively.

In this way, by differentiating in the discharge amount between droplets corresponding to adjacent target positions and associating the target and the impact positions for each discharge amount, the distance between the target positions increases, making it possible to reduce the possibility of wrong association between the target and the impact positions of droplets. This enables correctly performing the discharge timing correction and hence enables performing the imprint processing under the discharge conditions with an improved impact position accuracy, making it possible to prevent the protrusion of the imprint material and the occurrence of an unfilled defect in the mold pressing step.

Figure 11:
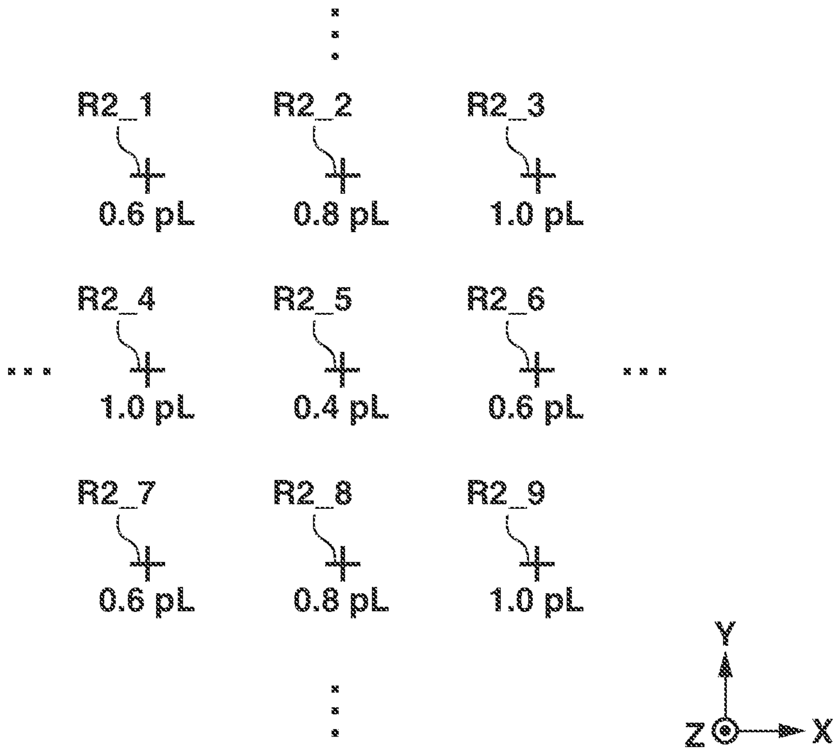
FIG. 11 illustrates target positions of a droplet pattern discharged based on an adjustment recipe according to a second exemplary embodiment.
Figure 12A:
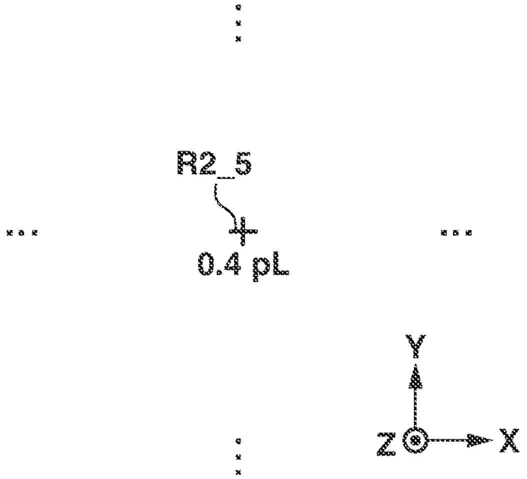
FIGS. 12A to 12D illustrate target positions of droplets for each discharge amount in the adjustment recipe illustrated in FIG. 11.
Figure 12B:
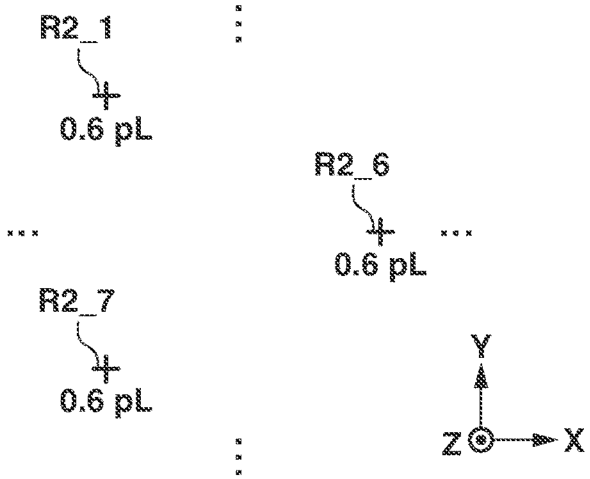
Figure 12C:
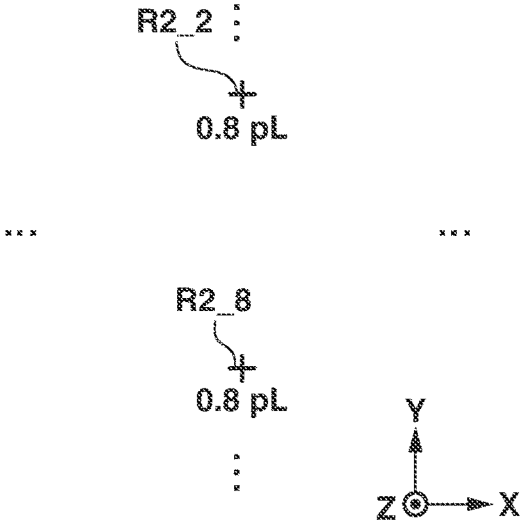
Figure 12D:
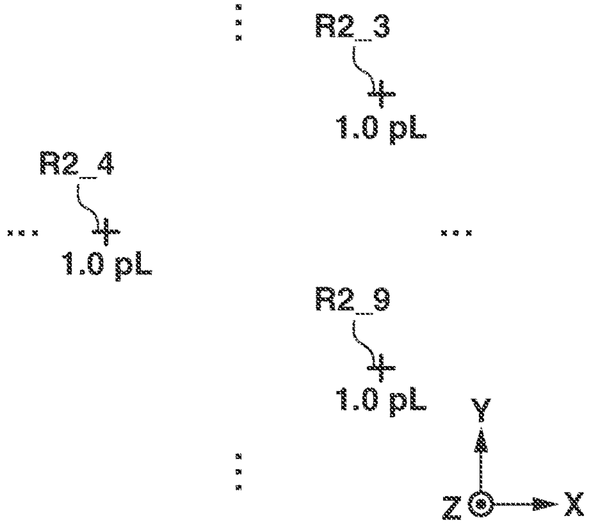

A second exemplary embodiment will be described below with reference to FIGS. 11 and 12 centering on a case where the adjustment recipe includes four different droplets with 0.4-pL, 0.6-pL, 0.8-pL, and 1.0-pL discharge amounts. FIG. 11 illustrates examples of target positions for a droplet pattern to be discharged in the adjustment recipe. FIG. 11 illustrates a target position R2_5 of droplets with a 0.4-pL discharge amount, target positions R2_1, R2_6, and R2_7 of droplets with a 0.6-pL discharge amount, target positions R2_2 and R2_8 of droplets with a 0.8-pL discharge amount, and target positions R2_3, R2_4, and R2_9 of droplets with a 1.0-pL discharge amount.

When the adjustment data is generated based on the adjustment recipe in FIG. 11 (S303), the target positions of droplets for each discharge amount as illustrated in FIGS. 12A to 12D result. FIGS. 12A, 12B, 12C, and 12D illustrate extracted target positions of droplets with 0.4-pL, 0.6-pL, 0.8-pL, and 1.0-pL discharge amounts, respectively.

Like the present exemplary embodiment, by increasing the number of discharge amounts of droplets as the adjustment data, the distance between the target positions increases, making it possible to reduce the possibility of wrong association between the target and the impact positions of droplets. Although the present exemplary embodiment has been described above centering on droplets with four different discharge amounts in the adjustment recipe, the number of discharge amounts may be increased.

(About Article Manufacturing)

A cured material pattern formed by using the above-described imprint apparatus 100 is permanently used for at least a part of various articles or temporarily used in manufacturing various articles.

Examples of articles include electrical circuit elements, optical elements, micro electro mechanical systems (MEMS), recording elements, sensors, and molds. Examples of electrical circuit elements include volatile and nonvolatile semiconductor memories such as dynamic random access memories (DRAMs), static random access memories (SRAMs), flash memories, and magnetoresistive random access memories (MRAMs), and semiconductor devices such as large scale integrated circuits (LSIs), charge coupled device (CCD) sensors, image sensors, and field-programmable gate arrays (FPGAs). Examples of molds include a mold for imprint.

A cured material pattern is used as it is or temporarily used as a resist mask, as at least a part of component members of the above-described articles. A resist mask is removed after completion of etching or ion implantation in the substrate processing step.

Figure 13A:
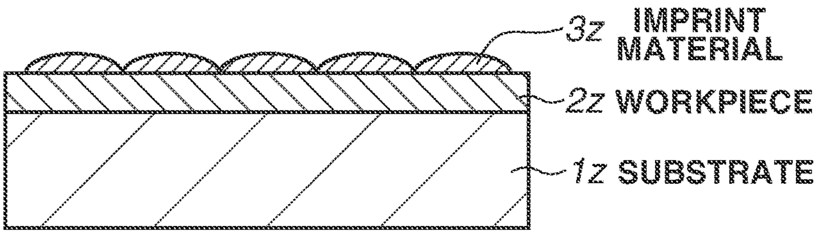
FIGS. 13A to 13F illustrate an article manufacturing method.

The following describes an article manufacturing method for forming a pattern on a substrate by using an imprint apparatus, processing the substrate with the pattern formed thereon, and manufacturing an article from the substrate W processed in this way, with reference to FIGS. 13A to 13F. As illustrated in FIG. 13A, a substrate 1*z* such as a silicon wafer is prepared. A workpiece 2*z* such as an insulator is formed on the surface of the substrate 1*z*. Then, an imprint material 3*z* is applied onto the surface of the workpiece 2*z* by an ink-jet method. FIG. 13A illustrates a state where the imprint material 3*z* having a shape of a plurality of droplets is applied onto the substrate 1*z*.

Figure 13B:
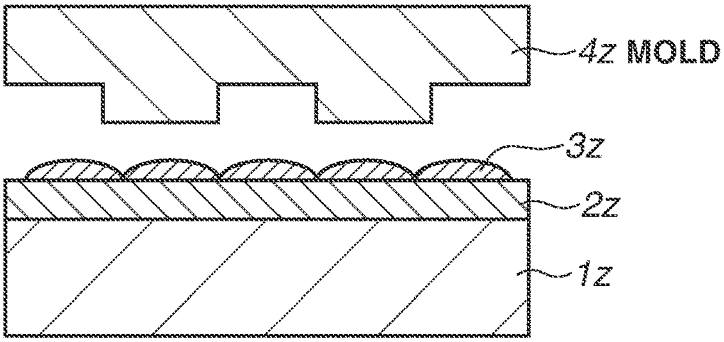
Figure 13C:
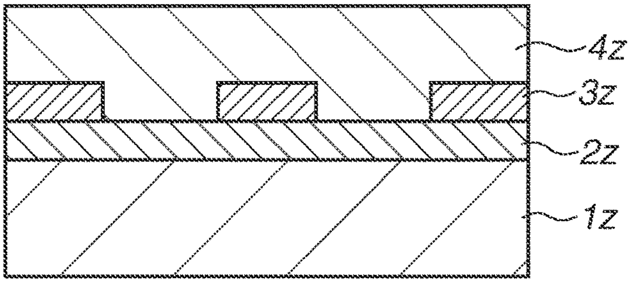

As illustrated in FIG. 13B, a mold 4*z* for imprint is disposed to face the imprint material 3*z* on the substrate 1*z*. The surface of the mold 4*z* with a concave-convex pattern formed thereon is oriented toward the imprint material 3*z*. As illustrated in FIG. 13C, the substrate 1*z* with the imprint material 3*z* applied thereto and the mold 4*z* are brought into contact with each other and then pressurized. The gap between the mold 4*z* and the workpiece 2*z* is filled with the imprint material 3*z*. In this state, when the imprint material 3*z* is irradiated with light as a curing energy via the mold 4*z*, the imprint material 3*z* is cured.

Figure 13D:
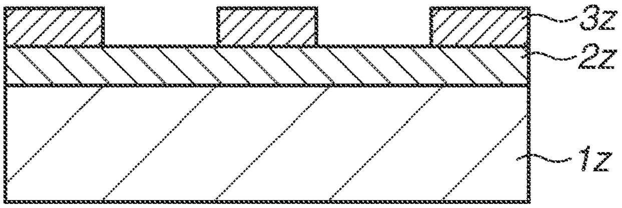

As illustrated in FIG. 13D, after the imprint material 3*z* has been cured, when the mold 4*z* and the substrate 1*z* are detached from each other, a pattern of the cured imprint material 3*z* is formed on the substrate 1*z*. The pattern of the cured material is shaped so that concave portions of the mold 4*z* fit convex portions of the cured imprint material 3*z*, and convex portions of the mold 4*z* fit concave portions of the cured imprint material 3*z*. This means that the concave-convex pattern of the mold 4*z* has been transferred onto the imprint material 3*z*.

Figure 13E:
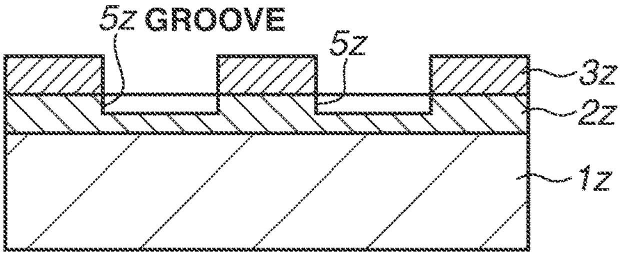
Figure 13F:
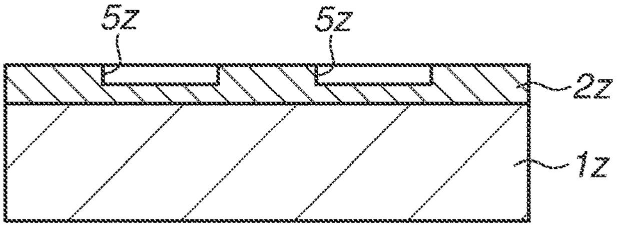

As illustrated in FIG. 13E, when etching is performed by using the pattern of the cured imprint material 3*z* as an etching-proof mask, surface portions of the workpiece 2*z* where the cured imprint material 3*z* is absent or thinly remains are removed to form grooves 5*z*. As illustrated in FIG. 13F, when the pattern of the cured imprint material 3*z* is removed, the obtained article has the grooves 5*z* formed on the surface of the workpiece 2*z*. Although the pattern of the cured imprint material 3*z* is removed in this example, the cured imprint material 3*z* may not be removed after the processing. For example, the cured imprint material 3*z* may be used as a film for insulation between layers included in a semiconductor device, more specifically, as a component member of the article.

An article manufacturing method also includes a step of forming a pattern on an imprint material supplied (applied) onto the substrate 1*z* by using the above-described imprint apparatus (imprint method), and a step of processing the substrate 1*z* with the pattern formed thereon in the above-described step. The manufacturing method further includes other known processes (oxidization, coating, vapor deposition, doping, flattening, etching, resist removing, dicing, bonding, and packaging). The article manufacturing method according to the present exemplary embodiment can be said to be advantageous in at least one of performance, quality, productivity, and production cost of articles in comparison with the conventional method.

While the present disclosure has specifically been described based on the above-described preferred exemplary embodiments, the present disclosure is not limited thereto, naturally, but can be modified and changed in diverse ways within the ambit of the appended claims.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-151161, filed Sep. 16, 2021, which is hereby incorporated by reference herein in its entirety.

What is claimed is:

1. A liquid discharge apparatus comprising:
a substrate stage configured to hold a substrate;
a discharge unit having nozzles for discharging droplets;
a control unit configured to control to discharge a plurality of droplets from the nozzles onto the substrate by supplying a plurality of driving signals for discharging droplets of different volumes to the discharge unit; and
an acquisition unit configured to acquire sizes of the droplets discharged onto the substrate,
wherein the control unit associates each of the plurality of driving signals with a different one of the plurality of droplets on the substrate based on the sizes of the droplets on the substrate acquired by the acquisition unit.

2. The liquid discharge apparatus according to claim 1, wherein the control unit determines correction conditions for correcting impact positions based on a deviation amount from target positions of the droplets corresponding to the identified driving signals.

3. The liquid discharge apparatus according to claim 2,
wherein the acquisition unit is configured to also acquire impact positions of the droplets, and
wherein the control unit identifies the deviation amount from the target positions by using the impact positions of the droplets acquired by the acquisition unit.

4. The liquid discharge apparatus according to claim 2, wherein the control unit determines the timing of supplying the driving signals to the nozzles as the correction conditions.

5. The liquid discharge apparatus according to claim 2, wherein the control unit determines drive conditions of the substrate stage as the correction conditions.

6. The liquid discharge apparatus according to claim 2, wherein the control unit determines the correction conditions so that the impact positions are corrected based on the deviation amount from the target positions of the droplets corresponding to the driving signals for discharging a predetermined amount of droplets, out of the identified driving signals.

7. The liquid discharge apparatus according to claim 1, wherein the droplets acquired by the acquisition unit are discharged from the discharge unit onto the substrate held by the substrate stage while the substrate stage is being moved at a predetermined speed.

8. The liquid discharge apparatus according to claim 1,
wherein the discharge unit includes a plurality of nozzles, and
wherein the control unit performs control to supply driving signals so that droplets of different volumes discharged from adjacent nozzles are placed at adjacent positions.

9. A film forming apparatus comprising:
the liquid discharge apparatus according to claim 1;
a mold holding unit configured to hold a mold; and
a curing unit configured to cure a curable composition,
wherein a liquid discharged by the discharge unit is a curable composition, and
wherein the control unit controls the curing unit to cure the curable composition to form a film in a state where the curable composition on the substrate and the mold are in contact with each other.

10. An article manufacturing method comprising:
forming a film on a substrate by using the film forming apparatus according to claim 9;
processing the substrate on which the film is formed; and
manufacturing an article based on the processed substrate.

11. A liquid discharge method comprising:
discharging a plurality of droplets from nozzles for discharging a liquid onto a substrate by supplying a plurality of driving signals for discharging droplets of different volumes to a discharge unit;
acquiring sizes of the droplets on the substrate discharged in the discharging; and
associating each of the plurality of driving signals with a different one of the plurality of droplets on the substrate based on the sizes of the droplets on the substrate acquired in the acquisition.

12. The liquid discharge method according to claim 11, further comprising determining correction conditions for correcting impact positions based on a deviation amount from target positions of the droplets corresponding to the driving signals identified in the identification.

* * * * *